US012208590B2

(12) United States Patent
Vandenhecke

(10) Patent No.: US 12,208,590 B2
(45) Date of Patent: Jan. 28, 2025

(54) LINE FOR MANUFACTURING PACKAGINGS IN THE FORM OF FOLDING BOXES

(71) Applicant: BOBST LYON, Villeurbanne (FR)

(72) Inventor: David Vandenhecke, Meximieux (FR)

(73) Assignee: BOBST LYON, Villeurbanne (FR)

( * ) Notice: Subject to any disclaimer, the term of this patent is extended or adjusted under 35 U.S.C. 154(b) by 0 days.

(21) Appl. No.: 17/310,963

(22) PCT Filed: Mar. 6, 2020

(86) PCT No.: PCT/EP2020/025113
§ 371 (c)(1),
(2) Date: Sep. 2, 2021

(87) PCT Pub. No.: WO2020/182346
PCT Pub. Date: Sep. 17, 2020

(65) Prior Publication Data

US 2022/0152969 A1 May 19, 2022

(30) Foreign Application Priority Data

Mar. 8, 2019 (FR) ....................................... 1902388

(51) Int. Cl.
*B31B 50/00* (2017.01)
*B31B 50/04* (2017.01)
(Continued)

(52) U.S. Cl.
CPC .......... *B31B 50/005* (2017.08); *B31B 50/006* (2017.08); *B31B 50/04* (2017.08);
(Continued)

(58) Field of Classification Search
CPC ..... B31B 50/005; B31B 50/62; B31B 50/006; B31B 50/146; B31B 50/22; B31B 50/04;
(Continued)

(56) References Cited

U.S. PATENT DOCUMENTS 4,715,847 A * 12/1987 Focke ..................... B26F 1/384
83/100
4,759,741 A * 7/1988 Chisholm, Jr. .......... B65H 5/34
493/182
(Continued)

FOREIGN PATENT DOCUMENTS

CN 1503723 A 6/2004
CN 101873926 A 10/2010
(Continued)

OTHER PUBLICATIONS

International Search Report issued May 4, 2020 in PCT/EP2020/025113 (2 pages).

*Primary Examiner* — Sameh Tawfik
(74) *Attorney, Agent, or Firm* — Bookoff McAndrews, PLLC

(57) ABSTRACT

The invention relates to a line for manufacturing packagings producing folding boxes from plate elements, which comprises a feeding station, a shaping unit which consecutively shapes the plate elements by slitting, scoring and cutting operations, provided with pairs of shafts and a cutting unit, which engage to produce, in the shaped plate element, two juxtaposed folding box layers, arranged transversely to the direction of transport, which are associated in series, and connected to one another by attachment points, a folding/gluing unit which forms folded assemblies by folding and gluing the shaped plate elements, a counting/ejection unit which forms stacks of folded assemblies, and a unit for separating folding boxes comprising means arranged to produce, by breaking the attachment points, two separate batches of stacked folding boxes from each stack of folded assemblies.

15 Claims, 2 Drawing Sheets

(51) Int. Cl.

| | |
|---|---|
| ***B31B 50/14*** | (2017.01) |
| ***B31B 50/22*** | (2017.01) |
| ***B31B 50/26*** | (2017.01) |
| ***B31B 50/62*** | (2017.01) |
| ***B31B 50/92*** | (2017.01) |
| *B31B 100/00* | (2017.01) |

(52) U.S. Cl.
CPC ............ *B31B 50/146* (2017.08); *B31B 50/22* (2017.08); *B31B 50/26* (2017.08); *B31B 50/62* (2017.08); *B31B 50/92* (2017.08); *B31B 2100/0022* (2017.08)

(58) Field of Classification Search
CPC .. B31B 50/26; B31B 50/92; B31B 2100/0022
USPC .......................................................... 493/56
See application file for complete search history.

(56) References Cited

U.S. PATENT DOCUMENTS

| | | | | |
|---|---|---|---|---|
| 5,158,522 | A * | 10/1992 | Cummings | B26D 1/20 493/182 |
| 5,163,891 | A * | 11/1992 | Goldsborough | B26D 7/27 493/324 |
| 8,579,777 | B2 * | 11/2013 | Hatano | B31B 50/00 493/182 |
| 10,800,061 | B2 * | 10/2020 | Yamamuro | B26D 1/285 |
| 11,577,482 | B2 * | 2/2023 | Giancaterino | B31B 50/16 |
| 2011/0092351 | A1 * | 4/2011 | Hatano | B31B 50/00 493/162 |
| 2013/0184133 | A1 * | 7/2013 | Sugimoto | B65H 29/62 493/29 |
| 2014/0162862 | A1 | 6/2014 | Shimura et al. | |
| 2014/0326119 | A1 | 11/2014 | Endoh | |
| 2022/0176669 | A1 * | 6/2022 | Fleury | B31B 50/20 |

FOREIGN PATENT DOCUMENTS

| | | | |
|---|---|---|---|
| CN | 108430753 | A | 8/2018 |
| EP | 0187323 | A1 | 7/1986 |
| EP | 0868996 | A | 10/1998 |
| EP | 2228206 | A1 | 9/2010 |
| GB | 01042985 | A | 9/1966 |
| IT | 970760 | A1 | 10/1998 |
| JP | S49023078 | A | 3/1974 |
| JP | H08500297 | A | 1/1996 |
| JP | 2002067190 | A | 3/2002 |
| JP | 2010012628 | | 1/2010 |
| JP | 2019018536 | A | 2/2019 |
| WO | 9322113 | A1 | 11/1993 |
| WO | 02085611 | A1 | 10/2002 |
| WO | 2013029768 | A1 | 3/2013 |

* cited by examiner

LINE FOR MANUFACTURING PACKAGINGS IN THE FORM OF FOLDING BOXES

CROSS-REFERENCE TO RELATED APPLICATION(S)

This application is a National Stage under 35 U.S.C. § 371 of International Application No. PCT/EP2020/025113, filed on Mar. 6, 2020, which claims priority to French Patent Application No. 1902388, filed Mar. 8, 2019, the contents of all of which are incorporated by reference in their entirety.

This invention relates generally to the field of packaging. More particularly, the invention relates to a line for manufacturing packagings in the form of folding boxes, from plate elements, for example, of corrugated cardboard.

In the packaging industry, cardboard cases, or boxes, are commonly made from plate elements in the form of flat or corrugated cardboard sheets. The plate elements are processed in a continuous stream in a packaging manufacturing line in which they are printed, cut and scored, folded and glued together to form the boxes.

STATE OF THE ART

With reference to FIG. 1, in a known type of packaging manufacturing line, the plate elements 1 are fed into the manufacturing line in a so-called "transverse" manner and are continuously conveyed in a direction of transport DA. The plate element 1 is consecutively processed by a printing unit, a plate element shaping unit, here formed by a unit also known as a "slotter", and a folding-gluing unit. The printing unit prints the plate element 1, typically using flexographic printing. The printed plate element $\mathbf{1}_a$ is then shaped by the plate element shaping unit, which substantially carries out slitting 10 and scoring 11 for fold lines, in order to create box sides 12 and box flaps 13. The cut out plate element $\mathbf{1}_b$, supplied by the plate element shaping unit, is then folded and glued in the folding-gluing unit to obtain a packaging $\mathbf{1}_c$ in the form of a folding box. The folding boxes $\mathbf{1}_c$ are received by a counting/ejection unit, which forms a stack of folding boxes $\mathbf{1}_d$ which is then tied up. The tied up stack $\mathbf{1}_e$ then moves to a palletizer at the end of the packaging manufacturing line.

In the prior art packaging manufacturing line described above, a plate element shaping unit of the type described in WO 2013/029768 allows the achievement of a high manufacturing rate of up to 20,000 boxes/hour. This plate element shaping unit has four pairs of cylindrical shafts that are disposed transversely to the direction of transport of the plate element. The cylindrical shafts rotate at high speed and perform the various processing operations on the plate elements. The majority of the bends and cut-outs are carried out in the direction of transport of the plate elements in the unit. The shapes and dimensions of the slits are determined by cutting tools, mounted on cylindrical tool-carrying shafts, which ensure a rotary cutting. The movement of the plates is continuous between the cylindrical tool-carrying shafts and the cylindrical counter-tool-carrying shafts. The cylindrical counter-tool-carrying shafts are arranged in parallel and opposite to the cylindrical tool-carrying shafts, to engage with the latter. The rotary cutting tools comprise laterally spaced blades arranged to create the slits at and starting out from front and rear edges 14 and 15 of the plate element. In addition to the rotary cutting tools, the plate element shaping unit likewise comprises laterally spaced rotary scoring tools arranged to create the fold lines on the plate element.

In the plate element shaping unit, a lateral gluing tab 16 is likewise cut out of the plate element as an extension of the box sides 12. After folding, this tab is glued to the opposite box side to form the folding box $\mathbf{1}_c$. For the execution of the lateral gluing tab, a specific tooling is provided in the plate element shaping unit, which tooling is arranged in such a way that two cuts are made transversely, or obliquely, in relation to the direction of transport of the plate element, as well as a first slitting starting from the rear edge and a second slitting starting from the front edge.

In the manufacture of packagings from plate elements, the arrangement of several layers in a single plate element is known, this in order to maximize the production of folding boxes in a packaging manufacturing line that has a set plate processing rate.

Document EP2228206 describes a packaging manufacturing line comprising a shaping unit having a plurality of rotating shafts, on which the shaping tools are arranged. Sheets of cardboard are shaped so as to produce two boxes from the same sheet. This is to say that the slitting and scoring operations that define two distinct boxes are carried out on the same sheet. A cutting unit provided with blades is arranged upstream of the folding-gluing module.

DISCLOSURE OF THE INVENTION

It is desirable to provide a solution which would allow an increase of the production of folding boxes in a packaging line of the type described above, with a shaping of the plate elements by means of pairs of rotating cylindrical shafts.

According to a first aspect, the invention relates to a packaging manufacturing line producing folding boxes from plate elements.

In accordance with the invention, the manufacturing line comprises:

- a plate element feeding station supplying the manufacturing line with a continuous flow of plate elements which move forward in the manufacturing line according to a direction of transport,
- a plate element shaping unit which consecutively shapes the plate elements by slitting, scoring and cutting operations, provided with pairs of rotating cylindrical shafts, and a cutting unit, the shaping unit and the cutting unit engaging to produce, in the shaped plate element, two juxtaposed folding box layers, arranged transversely to the direction of transport, which are associated in series, and connected to one another by attachment points
- a folding-gluing unit which forms folded assemblies by folding and gluing the shaped plate elements
- a counting-ejection unit which forms stacks of folded assemblies, and
- a unit for separating folding boxes with means arranged to produce two separate batches of stacked folding boxes from each stack of folded assemblies by breaking the attachment points, and wherein the unit for separating folding boxes is arranged downstream of the folding-gluing unit in the direction of transport.

This invention allows great flexibility in terms of the sizes of the boxes produced. Typically, machines of the "Flexo-Folder-Gluer" type are used in the production of corrugated boxes. The size of the box produced depends on the size of the machine, and more specifically the size of the conveyance shafts in order to ensure proper transport. Thanks to this process, it is possible to produce boxes that are smaller than the standard mini format, by separating them after the process of shaping of the boxes, this thanks to the breaker located at the end of the line (for example, 190 mm push format instead of 250 mm).
This optimization of use in the folding-gluing module also allows to obtain a higher speed in production in order to increase the capacity and the number of boxes produced per hour.

In one variant, the shaping unit comprises two pairs of rotating cylindrical shafts which engage to provide central slits in each plate element aligned on a transverse center axis of the plate element, and two pairs of rotating cylindrical shafts engaging to respectively provide slits to the rear edge of a rear layer of the two juxtaposed layers of the plate element and slits to the front edge of a front layer of the two juxtaposed layers of the plate element.

In one variant, the shaping unit comprises a pair of rotating cylindrical shafts arranged to perform operations for the cutting of a box tab of a back layer of the two juxtaposed layers of the plate element and operations for the pre-scoring of fold lines in the two layers of the plate element.

In one variant, the shaping unit comprises a pair of rotating cylindrical shafts arranged to perform operations for cutting a box tab of a front layer of the two juxtaposed layers of the plate element, and operations for scoring of the fold lines in the two layers of the plate element, and a pair of rotating cylindrical shafts arranged to perform crushing operations in the two layers of the plate element.

In one variant, the shaping unit comprises first and second plate element processing units, associated in series, and having a same architecture with the pairs of rotating cylindrical shafts bearing a shaping tooling and through which the plate elements pass.

In one variant, the first and second plate element processing units each comprise four pairs of rotating cylindrical shafts aligned and arranged transversely to the direction of transport, the first and second plate element processing units being associated to form an alignment of eight pairs of rotating cylindrical shafts.

In one variant, in the direction of transport, the first plate element processing unit comprises second and fourth pairs of rotating cylindrical shafts engaging to make center slits in each plate element aligned on a transverse center axis of the plate element, and the second plate element processing unit comprises second and fourth pairs of rotating cylindrical shafts engaging to respectively provide rear edge slits of a rear layer of the two juxtaposed layers of the plate element and front edge slits of a front layer of the two juxtaposed layers of the plate element.

In one variant, in the direction of transport, the first plate element processing unit comprises a third pair of rotating cylindrical shafts arranged to perform operations for cutting of a box tab of a back layer of the two juxtaposed layers of the plate element and operations for pre-scoring of fold lines in the two layers of the plate element, and a first pair of rotating cylindrical shafts arranged to perform a conveyance of the plate element.

In one variant, in the direction of transport, the second plate element processing unit comprises a third pair of rotary cylindrical shafts arranged to perform cutting operations of a box tab of a front layer of the two juxtaposed layers of the plate element and operations for scoring of fold lines in the two layers of the plate element, and a first pair of rotating cylindrical shafts arranged to perform operations for crushing in the two layers of the plate element.

In one variant, the cutting unit is a rotary cutter with rotating cylindrical shafts.

In one variant, the unit for separating folding boxes comprises two separators for folding boxes arranged in series, one after the other.

In one variant, the line comprises a printing unit located, relative to the direction of transport, upstream of the plate element shaping unit.

In one variant, the line comprises a tying unit located, relative to the direction of transport, upstream of the unit for separating folding boxes, the tying unit having two individual tying machines for independently tying two assemblies of folding boxes stacked in the stack of folded assemblies.

BRIEF DESCRIPTION OF THE DRAWINGS

Further advantages and features of this invention will become clearer from the following detailed description of a particular embodiment of the invention, with reference to the appended drawings, in which.

The longitudinal direction is defined with reference to the direction of travel or transport of the plate elements in the packaging manufacturing line, along their longitudinal centerline. The transverse direction is defined as the perpendicular direction in a plane that is horizontal to the direction of travel of the plate elements. The upstream and downstream directions are defined with reference to the direction of movement of the plate elements, following the longitudinal direction throughout the packaging manufacturing line, from the line entrance to the line exit. The proximal and distal edges of the plate element are defined in this non-limiting example with respect to the driver side and the side opposite to the driver side of the machine and the plate element shaping unit as the plate element travels forward.

DETAILED DESCRIPTION OF PREFERRED EMBODIMENTS

Figure 2:
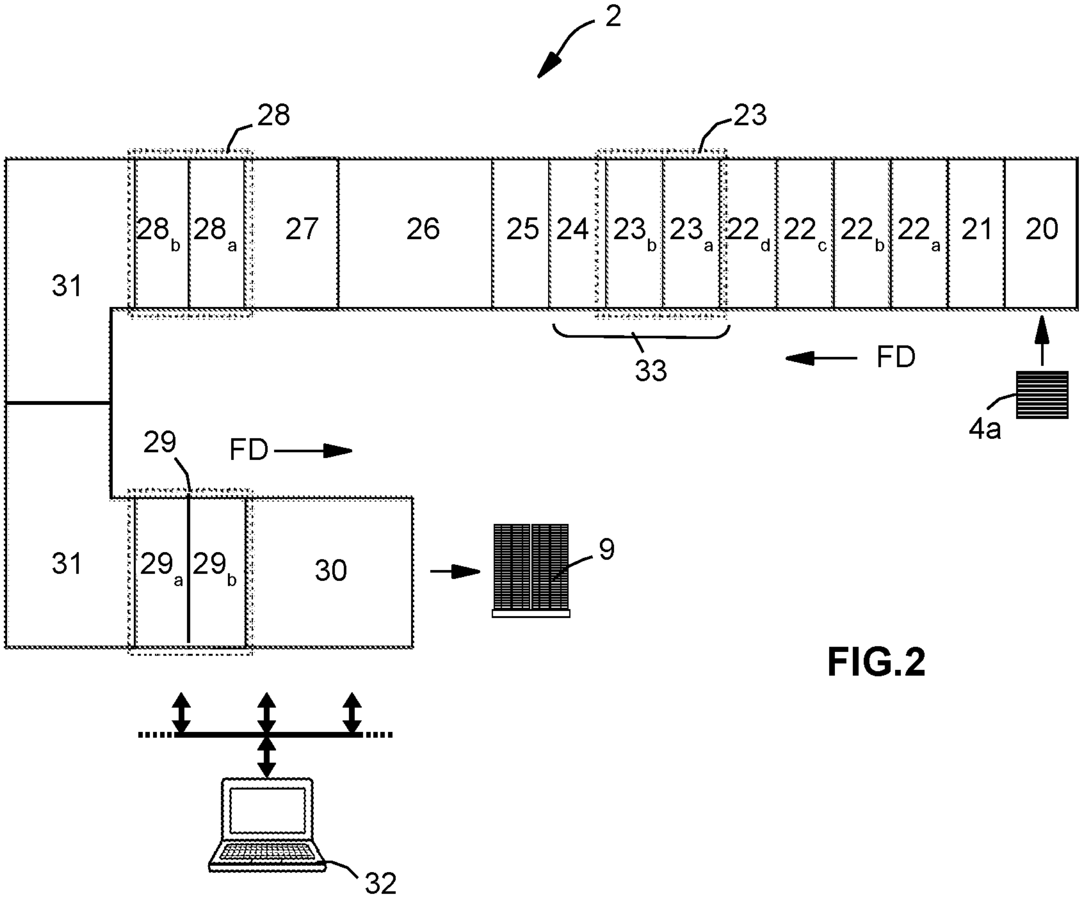
FIG. 2 is a block diagram showing a particular embodiment of a packaging manufacturing line according to this invention.
Figure 3:
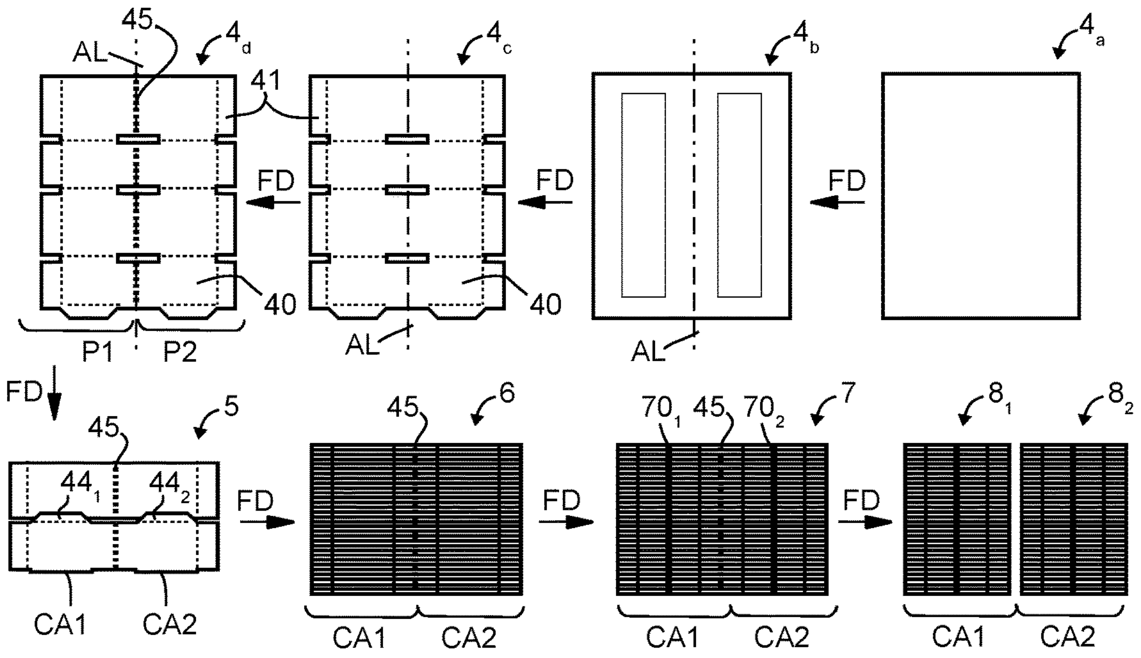
FIG. 3 is a diagram showing a process for manufacturing packagings in the form of folding boxes according to this invention.
Figure 4:
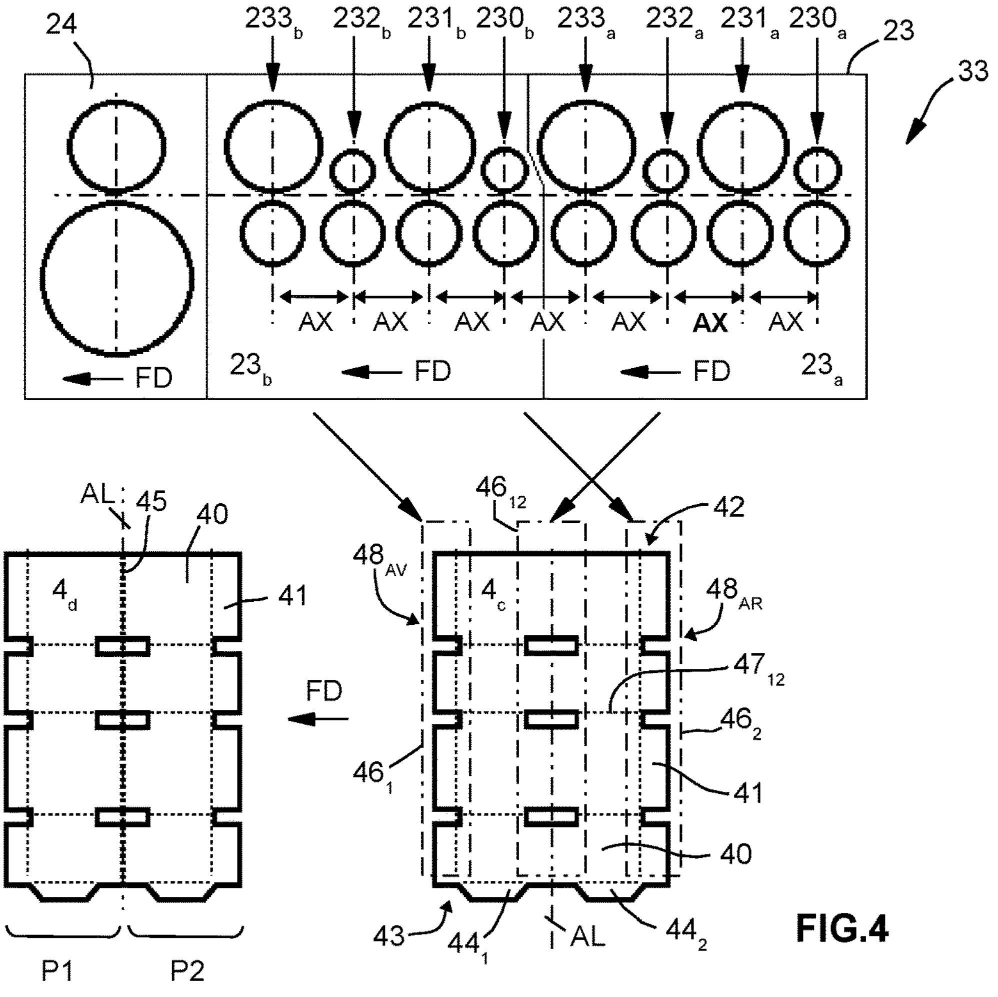
FIG. 4 is a diagram showing a general architecture of a plate element shaping unit integrated in the packaging manufacturing line of FIG. 1.

With reference to FIG. 2 to FIG. 4, a particular embodiment 2 of a line for manufacturing packagings according to the invention from plate elements in the form of corrugated cardboard sheets is here described by way of example.

The plate elements in their different states of processing are globally referred to by the reference mark 4 in FIG. 2 to FIG. 4, with index letters a, b, c and d associated with the reference mark 4 to indicate the state of processing of the plate element in question. The plate element 4 is shown in FIG. 3 in different states of processing, explained below, with the reference marks $\mathbf{4}_a$, $\mathbf{4}_b$, $\mathbf{4}_c$ and $\mathbf{4}_d$.

The direction of transport of the plate elements 4 from upstream to downstream in the packaging manufacturing line 2 is indicated by the arrow FD in all of FIG. 2 to FIG. 4.

As visible in FIG. 2, the packaging manufacturing line 2 comprises a plurality of units and devices 20 to 33 that are synchronized on a single machine step, and that consecutively perform the various operations required for the manufacture of packagings in the form of folding boxes. All of the units and devices of the packaging manufacturing line 2 are synchronously controlled by one or more control units 32 provided with man-machine interfaces.

Thus, in the direction of transport FD of the sheets, the packaging manufacturing line 2 substantially comprises, in the example, an automatic plate element feeding station 20, a feeder 21, four flexographic printing units $\mathbf{22}_a$ to $\mathbf{22}_d$, a shaping unit 33 with a plate element processing unit 23 and a cutting unit 24, a stripper-vibrator 25, a folder-gluer 26, a counter-ejector 27, a double tying machine 28, a unit for separating folding boxes 29 and a palletizer 30.

The plate element processing unit 23 in combination with the cutting unit 24 form a plate element shaping unit 33 (FIG. 2 and FIG. 4).

Two conveyor tables 31 are arranged one after the other in this packaging manufacturing line 2, in order to achieve a 180 degree change of direction of the line to allow its implementation in a limited floor area. Other configurations are possible, for example without any table, so as to keep the tied stack $\mathbf{1}_e$ in the same rectilinear direction up to the unit for separating folding boxes 29, or with a single table for a 90 degree change in direction of the tied stack $\mathbf{1}_e$.

The automatic plate element feeding station 20 has the function of feeding plate elements $\mathbf{4}_a$ to the packaging manufacturing line 2. The plate elements $\mathbf{4}_a$ are the blank plate elements to be processed by the line 2 to form the packagings. As is visible in FIG. 3, the plate element $\mathbf{4}_a$ is typically a rectangular sheet of cardboard.

In station 20, the plate elements $\mathbf{4}_a$ are successively inserted, one by one, into the packaging manufacturing line 2 at a cadence corresponding to the machine step on which the various units of line 2 are synchronized.

After being inserted into the line 2, the plate element $\mathbf{4}_a$ is fed into the feeder 21. The feeder 21 performs an alignment operation and corrects, for example, a position of an edge of the plate element $\mathbf{4}_a$ to achieve the desired positioning for printing operations performed by the four printing units $\mathbf{22}_a$ to $\mathbf{22}_d$.

The printing units $\mathbf{22}_a$ through $\mathbf{22}_d$ perform four-color flexographic printing on the plate element $\mathbf{4}_a$, with the printing units $\mathbf{22}_a$ through $\mathbf{22}_d$ each printing a different color on the plate element $\mathbf{4}_a$. The printing units $\mathbf{22}_a$-$\mathbf{22}_d$ output a printed plate element $\mathbf{4}_b$, visible in FIG. 3, which is fed into the plate element shaping unit 33.

With reference to FIG. 4, the plate element shaping unit 33 is associated with the cutting unit 24 to manufacture a cut plate element 4*d*, formed of two layers P1 and P2, respectively referred to as "front layer" and "back layer", from the printed plate element $\mathbf{4}_b$. In the cut plate element 4*d*, the layers P1 and P2 are arranged in juxtaposition, with respect to the direction of transport FD, and are connected to one another by attachment points 45. The attachment points 45 are aligned with a transverse central axis AL of the plate element 4*d*. Each layer P1 and P2 corresponds to a folding box packaging.

The plate element processing unit 23 processes the printed plate element $\mathbf{4}_b$ and provides a cut plate element 4*c*. In the cut plate element 4*c*, slitting and scoring operations have been performed to form box sides 40 and box flaps 41 for each of the layers P1 and P2. Other cutting operations were also performed, such as an edge cut on a distal side edge 42 of the plate element and tab cutouts, on the proximal opposite side edge 43, to form a box tab $\mathbf{44}_1$ and $\mathbf{44}_2$ for each of the layers P1 and P2. The plate element processing unit 23 performs all of the processing operations on the printed plate element $\mathbf{4}_b$ in a single machine step, to obtain the cut plate element $\mathbf{4}_c$.

The cutting unit 24 is typically a rotary cutter with rotating cylindrical shafts. The cutting unit 24 has the function of making the attachment points 45 between the layers P1 and P2 in the cut plate element $\mathbf{4}_c$ provided by the plate element processing unit 23, to obtain the cut plate element 4*d*.

In accordance with an embodiment example of the invention, the plate element processing unit 23 is formed by the association in series of two so-called slotter plate element processing units $\mathbf{23}_a$ and $\mathbf{23}_b$, which preferably have the same general architecture. The first unit $\mathbf{23}_a$ is traversed before the second unit $\mathbf{23}_b$ by the plate element moving in the direction of transport FD.

The performance of the processing operations on the plate element is optimized, by distributing these processing operations judiciously between the two units $\mathbf{23}_a$ and $\mathbf{23}_b$.

The plate element processing units $\mathbf{23}_a$ and $\mathbf{23}_b$, are of the type with four pairs of rotating cylindrical shafts. The double plate element processing unit 23 formed by the combination of units $\mathbf{23}_a$ and $\mathbf{23}_b$ thus has eight pairs of rotating cylindrical shafts, $\mathbf{230}_a$ to $\mathbf{233}_a$ for unit $\mathbf{23}_a$ and $\mathbf{230}_b$ to $\mathbf{233}_b$ for unit $\mathbf{23}_b$. The eight pairs of rotating cylindrical shafts, $\mathbf{230}_a$ to $\mathbf{233}_a$ and $\mathbf{230}_b$ to $\mathbf{233}_b$, are spaced apart from each other at the same center distance AX, as shown in FIG. 4. The length of the center distance AX typically corresponds to a minimum size of plate element that can be processed in the packaging manufacturing line 2.

The first plate element processing unit $\mathbf{23}_a$ makes central slits $\mathbf{46}_{12}$ in the sheet. As shown in the cut plate element $\mathbf{4}_c$, the central slits $\mathbf{46}_{12}$ are aligned in a transverse central axis AL of the plate element and participate in the formation of the box sides 40 and box flaps 41 of the layers P1 and P2. The central slits $\mathbf{46}_{12}$ are made here by the second and fourth pairs of rotating cylindrical shafts $\mathbf{231}_a$ and $\mathbf{233}_a$ which are equipped with suitable tools.

The first plate element processing unit $\mathbf{23}_a$ likewise performs first complementary processing operations which include the operations of cutting of the box tab $\mathbf{44}_2$ of the layer P2 and of pre-scoring operations $\mathbf{47}_{12}$ for, in particular, the making of fold lines in the layers P1 and P2. These first complementary processing operations are performed by tools mounted, for example, on the third pair of rotating cylindrical shafts $\mathbf{232}_a$ of the first plate element processing unit $\mathbf{23}_a$. The first pair of rotating cylindrical shafts $\mathbf{230}_a$ of the first plate element processing unit $\mathbf{23}_a$ is used here for conveyance of the sheet.

The second plate element processing unit $\mathbf{23}_b$ makes front edge slits 461 and rear edge slits 462. The slits 461 are made on a transverse front edge $\mathbf{48}_{AV}$ of the plate element and participate in the formation of the box sides 40 and the box flaps 41 of the layer P1. The slits 462 are formed on a transverse rear edge $\mathbf{48}_{AR}$ of the plate element and participate in the formation of the box sides 40 and the box flaps 41 of the layer P2. The front edge slits $\mathbf{46}_1$ and rear edge slits $\mathbf{46}_2$ are respectively made here by the fourth and second pairs of rotating cylindrical shafts $\mathbf{233}_b$ and $\mathbf{231}_b$, which are provided with suitable tools.

The second plate element processing unit $\mathbf{23}_b$ also performs complementary second processing operations that include the operations of cutting of the body tab $\mathbf{44}_1$ of the layer P1 and final scoring operations $\mathbf{47}_{12}$ for the performance of, in particular, the fold lines in the layers P1 and P2. These second complementary processing operations are performed by tools mounted, for example, on the third pair of rotating cylindrical shafts 232$_b$ of the second plate element processing unit 23$_b$.

In the second plate element processing unit 23$_b$, the first pair of rotating cylindrical shafts 230$_b$ performs a third complementary processing operation which corresponds to a crushing of the cardboard at the box tabs 44$_1$ and 44$_2$ on the proximal side edge 43, as well as a crushing of the cardboard at the opposite distal side edge 42. This crushing of the box tabs 44$_1$ and 44$_2$ and the opposite distal side edge 42 allows for the reduction of the thickness and is intended to avoid excess thickness in the folded and glued assembly 5 (FIG. 3), at the gluing of the flaps 44$_1$ and 44$_2$ to their respective opposite distal side edge 42 of the corresponding box sides.

The performance by the double plate element processing unit 23 of the aforementioned processing operations results in the cut plate element 4$_c$ shown in FIG. 3 and FIG. 4.

The cut plate element 4$_c$ is then fed into the cutting unit 24. Suitable tools are mounted in the rotating cylindrical shafts of the cutting unit 24 and make selective cuts in the plate element to obtain the attachment points 45. The cutting unit 24 outputs the cut plate element 4$_d$ comprising the layers P1 and P2 connected solely by the attachment points 45.

Referring once again, in particular, to FIG. 2 and FIG. 3, the cut plate element 4$_d$ is fed from the cutting unit 24 into the stripper-vibrator 25. In the stripper-vibrator 25, the plate element is cleaned up of dust and freed from the waste generated, in particular, by the slitting and cutting operations. The cut plate element 4$_d$ is then fed into the folder-gluer 26.

In the folder-gluer 26, the cut plate element 4$_d$ is folded and the box tabs 44$_1$ and 44$_2$ are glued to corresponding box sides to obtain the folded-glued assembly 5 formed by two folding boxes CA1 and CA2 connected by the attachment points 45, the two folding boxes CA1 and CA2 respectively corresponding to the layers P1 and P2.

The counter-ejector 27 recovers the folded assemblies 5 successively leaving the folder-gluer 26, counts them and forms a stack of folded assemblies 6 comprising a determined number of folded-glued assemblies 5 stacked on top of each other. The stack of folded assemblies 6 is then fed to the double tying machine 28.

The double tying machine 28 comprises two individual tying machines 28$_a$ and 28$_b$ entrusted with independently tying up the stacked folded boxes assembly CA1 and the stacked folded boxes assembly CA2. Two strapping bands, or ties 70$_1$ and 70$_2$ are thus placed on the stack of folded assemblies 6, the one 70$_1$ for the assembly of stacked folding boxes CA1 and the other 70$_1$ for the assembly of stacked folding boxes CA2. In this manner, a stack of tied up folded assemblies 7 is obtained, which is then fed to the unit for separating folding boxes 29.

The unit for separating folding boxes 29 is formed by the series combination of two separators 29$_a$ and 29$_b$ of folding boxes, also known as "breakers". The two successive separators 29$_a$ and 29$_b$ of folding boxes are entrusted with separating the tied up stack of folded assemblies 7 into two batches of tied up and stacked folding boxes 8$_1$ and 8$_2$, as visible in FIG. 3. The separation into two batches 8$_1$ and 8$_2$ is achieved by breaking the attachment points 45.

The breaking of the attachment points is achieved in the separators 29$_a$ and 29$_b$, by an automatic process that involves, for example, while exercising pressure, maintaining the assembly of stacked folding boxes CA1 and the assembly of stacked folding boxes CA2 on two respective support panels and spreading, or inclination, between these support panels to cause the breakage.

The batches of folding boxes 8$_1$ and 8$_2$ are then taken over by the palletizer 30, which automatically manages groupings 9 (FIG. 2) on shipping pallets.

The series combination of the two separators 29$_a$ and 29$_b$, forming the unit for separating folding boxes 29, makes it possible to optimize and achieve the desired manufacturing rate for the manufacture of folding boxes, from cut plate elements, comprising two layers.

Figure 1:
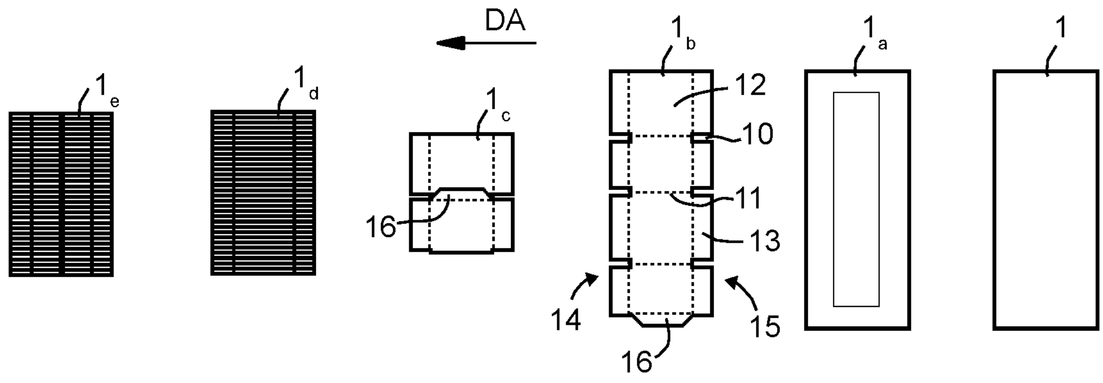
FIG. 1 is a diagram showing a process for the prior art manufacturing of packagings in the form of folding boxes.

With the same machine step, this invention makes it possible to double the manufacturing rate of folding boxes when compared to the prior art packaging manufacturing line, described with reference to FIG. 1. The packaging manufacturing line 2 according to the invention makes it possible to achieve a manufacturing rate of folding boxes of approximately 40,000 boxes/hour.

The invention is not limited to the particular embodiment which has been described herein by way of example. The person skilled in the art, depending on the applications of the invention, may make various modifications and variants falling within the scope of protection of the invention.

The invention claimed is:

1. A manufacturing line for producing folding boxes from plate elements, the manufacturing line comprising:

a plate element feeding station supplying the manufacturing line with a continuous flow of the plate elements that move forward in the manufacturing line according to a direction of transport;

a plate element shaping unit that consecutively shapes the plate elements by slitting, scoring, and cutting operations, the plate element shaping unit provided with pairs of rotating cylindrical shafts and a cutting unit that engages to produce, in each shaped plate element of the shaped plate elements, two juxtaposed folding box layers, arranged transversely to the direction of transport, and in series, and connected to one another by attachment points;

a folding-gluing unit that forms folded assemblies by folding and gluing the shaped plate elements;

a counting-ejection unit that forms a plurality of stacks, each stack having a plurality of the folded assemblies, each folded assembly having two folding boxes connected to one another by the attachment points, wherein the plurality of folded assemblies are stacked to form a first assembly of stacked folding boxes attached to a second assembly of stacked folding boxes; and a separating unit that separates folding boxes to produce two separate batches of folding boxes, wherein the separating unit comprises a series combination of a first separator and a second separator that separate the stacks, wherein the separating unit further comprises a first support panel and a second support panel, wherein, while the first assembly of stacked folding boxes is maintained on the first support panel, and the second assembly of stacked folding boxes is maintained on the second support panel, inclination between the first support panel and the second support panel breaks the first assembly of stacked folding boxes from the second assembly of stacked folding boxes and thereby produce the two separate batches of folding boxes, and wherein the separating unit for separating folding boxes is arranged downstream of the folding-gluing unit in the direction of transport.

2. The manufacturing line according to claim 1, wherein the pairs of rotating cylindrical shafts of the plate element shaping unit further comprise:

a second pair of shafts and a fourth pair of shafts which engage to provide central slits in each plate element, and aligned on a transverse central axis of the plate element, and a sixth pair of shafts and an eighth pair of shafts which engage to respectively provide slits in a rear edge of a rear layer of each plate element and slits in a front edge of a front layer of each plate element.

3. The manufacturing line according to claim 2, wherein the pairs of rotating cylindrical shafts of plate element shaping unit further comprise:

a third pair of shafts arranged to perform operations of cutting a box tab in the rear layer of each plate element and operations of pre-scoring fold lines in the front layer and the rear layer of each plate element.

4. The manufacturing line according to claim 3, wherein the pairs of rotating cylindrical shafts of plate element shaping unit further comprise:

a seventh pair of shafts arranged to perform operations of cutting a box tab in the front layer of each plate element, and operations of scoring the pre-scored fold lines in the front layer and the rear layer of each plate element, and a fifth pair of shafts arranged to perform crushing operations of the front layer and the rear layer of each plate element.

5. The manufacturing line according to claim 4, wherein the plate element shaping unit comprises:

first and second plate element processing units in series, having a same architecture of the pairs of rotating cylindrical shafts, and bearing a shaping tooling through which the plate elements pass, wherein the first plate element processing unit includes a first pair of shafts and the second, third, and fourth pairs of shafts, and the second plate element processing unit includes the fifth, sixth, seventh, and eighth pairs of shafts.

6. The manufacturing line according to claim 5, wherein the pairs of shafts of the first and second processing units are aligned and arranged transversely to the direction of transport, and the first and second processing units are arranged to form an alignment of the eight pairs of shafts.

7. The manufacturing line of claim 1, wherein each stack, prior to entering the separating unit, includes a first band around the first assembly of stacked folding boxes, and a second band around the second assembly of stacked folding boxes.

8. A manufacturing line for producing folding boxes from plate elements, the manufacturing line comprising:

a printing unit that prints the plate elements using flexographic printing, a plate element feeding station supplying the manufacturing line with a continuous flow of the plate elements from the printing unit, the plate elements moving forward in the manufacturing line according to a direction of transport;

a plate element shaping unit that shapes the plate elements by one or more of slitting, scoring, and cutting operations, the plate element shaping unit provided with pairs of rotating cylindrical shafts and a cutting unit that engages to produce, in each shaped plate element of the shaped plate elements, two juxtaposed folding box layers, arranged transversely to the direction of transport and in series, and connected to one another by attachment points;

a folding-gluing unit that forms folded assemblies by folding and gluing the shaped plate elements, each folded assembly having two folding boxes connected to one another by the attachment points; and a separating unit that (1) receives stacks of folded assemblies and (2) separates the folding boxes of the stacks of folded assemblies to produce two separate batches of stacked folding boxes by breaking the attachment points between the folding boxes, wherein the separating unit is arranged downstream of the folding-gluing unit in the direction of transport, wherein the separating unit comprises a first support panel and a second support panel, and wherein inclination between the first support panel and the second support panel breaks the first assembly of stacked folding boxes from the second assembly of stacked folding boxes.

9. The manufacturing line of claim 8, wherein the plate element shaping unit further comprises eight pairs of rotating cylindrical shafts that are spaced apart from one another at an equivalent distance.

10. The manufacturing line of claim 9, wherein the plate element shaping unit includes a first plate element processing unit and a second plate element processing unit, and the second plate element processing unit makes front edge slits and rear edge slits in the plate elements and scores the plate elements.

11. The manufacturing line of claim 8, the plate element shaping unit including a tooling that cuts a lateral gluing tab out of the plate element and makes two cuts transversely in relation to the direction of transport of the plate element.

12. The manufacturing line of claim 11, wherein the gluing tab is formed using a first slitting starting from a rear edge of a first plate element and a second slitting starting from a front edge of the first plate element.

13. The manufacturing line of claim 8, wherein the folded assemblies are stacked to form a first assembly of stacked folding boxes attached to a second assembly of stacked folding boxes, wherein the separating unit comprises a series combination of a first separator and a second separator that separate the stacks.

14. The manufacturing line of claim 13, wherein while the first assembly of stacked folding boxes is maintained on the first support panel, and the second assembly of stacked folding boxes is maintained on the second support panel, spreading between the first support panel and the second support panel breaks the first assembly of stacked folding boxes from the second assembly of stacked folding boxes and thereby produce the two separate batches of folding boxes.

15. The assembly of stacked folding boxes, prior to entering the separating unit, includes a first band around the first manufacturing line of claim 13, wherein each assembly of stacked folding boxes and a second band around the second assembly of stacked folding boxes.

* * * * *